United States Patent

Dryer et al.

[11] Patent Number: 5,859,996
[45] Date of Patent: Jan. 12, 1999

[54] CLOCK SIGNAL SUPPLY FOR FAULT TOLERANT DATA PROCESSING

[75] Inventors: Michael David Dryer; Esmaeel Rabi-Laleh, both of Maldon, Great Britain

[73] Assignee: Industrial Control Services Technology Limited, Great Britain

[21] Appl. No.: 824,283

[22] Filed: Mar. 26, 1997

[30] Foreign Application Priority Data

Apr. 3, 1996 [GB] United Kingdom .................. 9607093

[51] Int. Cl.[6] .................................................. G06F 1/06
[52] U.S. Cl. .................................................. 395/556
[58] Field of Search .................................. 395/555, 556, 395/182.11, 182.09, 181, 182.1; 327/292

[56] References Cited

U.S. PATENT DOCUMENTS

| 4,185,245 | 1/1980 | Fellinger et al. | 327/292 |
| 4,282,493 | 8/1981 | Moreau | 327/292 X |
| 5,355,090 | 10/1994 | Pajowski et al. | |
| 5,371,764 | 12/1994 | Gillingham et al. | |
| 5,388,249 | 2/1995 | Hotta et al. | 395/556 X |

FOREIGN PATENT DOCUMENTS 0 280 258 A2  8/1988  European Pat. Off. .

*Primary Examiner*—Thomas M. Heckler
*Attorney, Agent, or Firm*—Dorn, McEachran, Jambor & Keating

[57] ABSTRACT

A clock signal source is described for providing three mutually independent clock signals to three processing sub-systems of a triplicated data processing system. The source comprises a master reference oscillator 10, a slave reference oscillator 12 phase locked to the master oscillator 10 and three mutually independent clock circuits 14a to 14c. Each of the clock phase circuits 14 is phase locked to the output signal of the reference oscillator 10 when it is functioning correctly, or to the slave reference oscillator 12 if a malfunction is detected in the master reference oscillator 10.

2 Claims, 1 Drawing Sheet

CLOCK SIGNAL SUPPLY FOR FAULT TOLERANT DATA PROCESSING

THE FIELD OF THE INVENTION

The present invention relates to fault tolerant data processing systems.

In designing data processing systems for critical applications, for example systems used in monitoring the operation of equipment in a fuel refinery, it is essential for the systems to be fault tolerant.

In order to ensure that a single hardware fault should not cause total system failure, it is known to include redundancy in the hardware. Thus, it has been proposed to duplicate data processing systems so that if one system should develop a fault, the other will remain functional. The difficulty with such a duplicated system is that it may not always be clear in the event of a discrepancy between the data generated by the two processing sub-systems, which of the two sub-systems has developed a fault and should be disregarded.

For this reason, data processing systems are known in which the hardware is triplicated and the outputs of three independent identical sub-systems are majority voted. The present invention is concerned with the clock signal supply for such a fault tolerant data processing system.

Data processing systems require a source of clock signals to synchronise the individual processing steps that occur within them. For example, if an arithmetic unit is to be used to sum the values stored in two memory locations and then to store the result in a further memory location, the individual steps required would be first to transfer the values to be summed from memory into the input registers of the arithmetic unit, to retrieve the values from the input registers and operate on them in the arithmetic unit, to transfer the result of the operation to an output register and then to transfer the result from the output register to memory. These steps must be carried out sequentially and clock signals are needed to ensure correct synchronisation of these various steps.

In a data processing system having three independent sub-systems operating in parallel, it is essential for their clock signals to be synchronised otherwise there could be discrepancies between the outputs of the three processing sub-systems caused simply by the time lag between them rather than because any one of them has developed a fault.

If one were to use a single source of clock signals, then all the processing sub-systems would of course remain in step, but the complete system would not be tolerant to a fault occurring within the single source of clock signals.

It has therefore also previously been proposed to provide three separate oscillators that are coupled to one another to lock the phases of the three oscillators to one another. This solution has not however proved entirely satisfactory because a risk exists of instability with all three oscillators trying to chase each other in order to remain in step.

The present invention therefore seeks to provide a source of clock signals for supplying stable clock signals to three independent processing sub-systems in which the source is itself fault tolerant and can supply independently generated and correctly synchronised clock pulses to the three processing sub-systems.

SUMMARY OF THE INVENTION

According to the present invention, there is provided a clock signal source for providing three mutually independent clock signals to three processing sub-systems of a triplicated data processing system, the source comprising a master reference oscillator, a slave reference oscillator phase locked to the master oscillator but capable of operating as an independent oscillator in the event of failure of the main reference oscillator, and three mutually independent clock circuits each connected to the master and slave reference oscillators; each clock circuit being capable of detecting malfunction of the reference oscillators and being phase locked to the output signal of the master reference oscillator when both master and slave reference oscillators are functional, and being phase locked to either one of the reference oscillators when a malfunction is detected in the other.

In the present invention, while the two reference oscillators are functional, all clock circuits are phase locked to the master oscillator and therefore remain in step. As the clock circuits are all independent of one another, a fault in any one clock circuit will affect that clock circuit alone and the other two clock circuits will continue in synchronous operation.

If the slave reference oscillator should develop a fault, then a warning is issued by the clock circuits that a fault has been detected but the clock circuits continue in synchronous operation because they each remain in phase with the master reference oscillator.

Should the master reference oscillator fail, the slave reference oscillator will cease to be phase locked to it but the slave reference oscillator will nevertheless continue to function independently. Each clock circuit will now be phase locked to the slave reference oscillator and will issue a warning of failure of the master reference oscillator.

In order for the clock circuits to detect a fault in one of the reference oscillators, it is preferred that each clock circuit should itself include a local oscillator. A comparison between the output signal of the local oscillator and the two reference oscillators will indicate if one of the reference oscillators is not oscillating or oscillating at an overtone of the correct frequency, these being the two common failure modes of the reference oscillators.

If both the master and slave reference oscillators should fail, the three mutually independent clock circuits will cease to operate in synchronism and the data processing system will be wound down in an orderly fashion.

BRIEF DESCRIPTION OF THE DRAWINGS

The invention will now be described further, by way of example, with reference to the accompanying drawing in which the single FIGURE shows a clock signal source in accordance with a preferred embodiment of the invention.

DESCRIPTION OF THE PREFERRED EMBODIMENT

Figure 1:
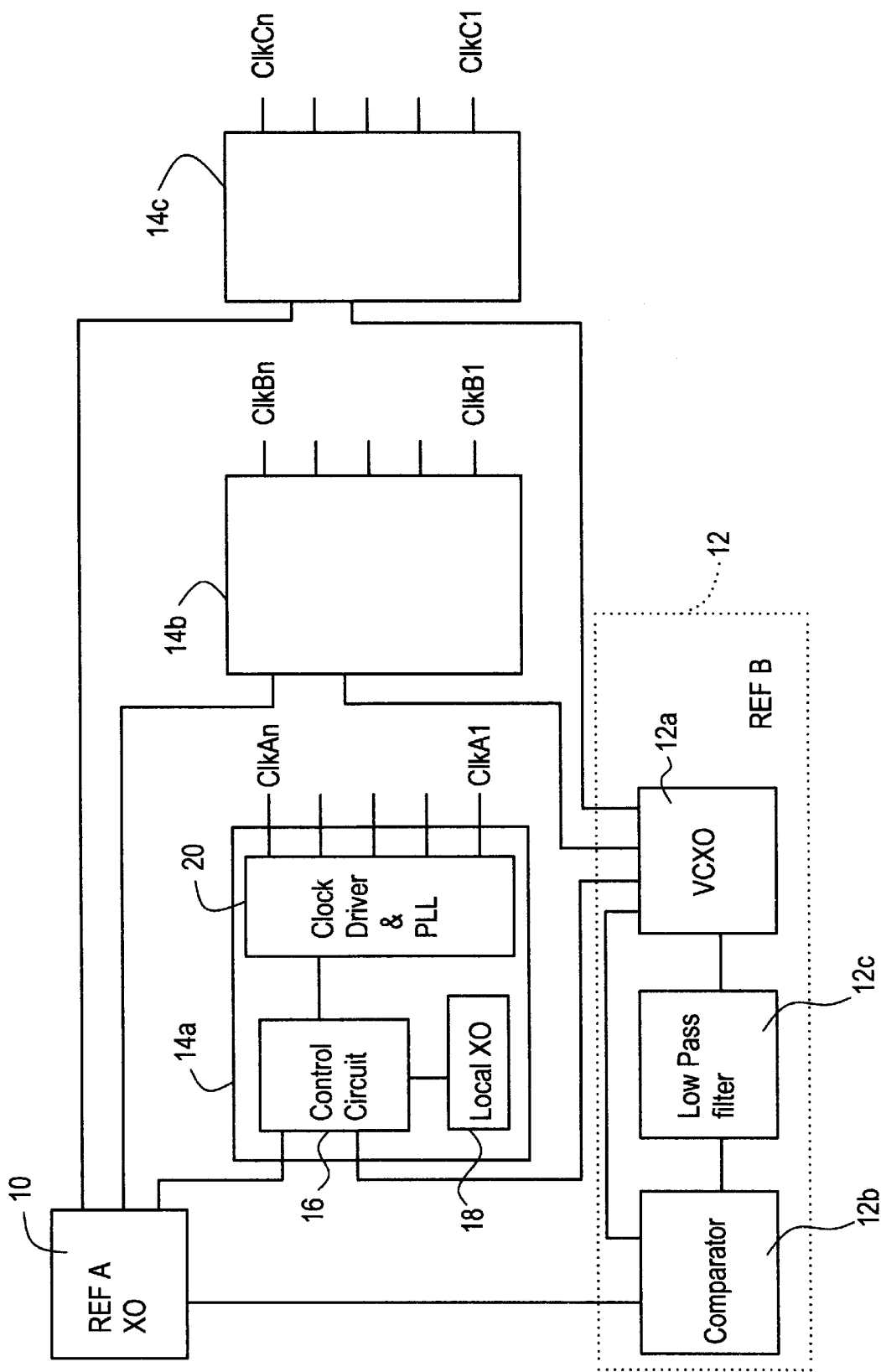

The clock signal source in the drawing comprises a master reference oscillator 10 which is formed as a stable crystal oscillator supplying the same reference signal to four separate outputs through respective separate buffer amplifiers (not shown). The buffer amplifiers ensure that there is no interaction between any circuits connected to the outputs of the master reference oscillator 10.

A first of the four outputs of the master reference oscillator 10 is applied to a reference slave oscillator 12. The reference slave oscillator 12 comprises a voltage controlled crystal oscillator 12*a* the output signal of which is compared in phase with the input signal that is received from the master reference oscillator 10 by a comparator 12*b*. The output of the comparator 12*b* is fed through a low pass filter 12c to the voltage controlled oscillator 12a, the closed negative feedback phase locked loop ensuring that the oscillator 12a is controlled to remain in phase with the master reference oscillator 10 at all times.

If the phase comparator 12b should fail to receive a signal from the master reference oscillator 10, then the voltage controlled oscillator 12a will receive a steady d.c. voltage maintaining its frequency at the nominal frequency of the slave reference oscillator 12a.

In common with the output signal of the master reference oscillator 10, the output of the slave reference oscillator 12 is applied through three separate buffer amplifiers to three clock circuits 14a, 14b and 14c.

Each of the clock circuits 14a to 14c thus receives two reference input signals, one from the master reference oscillator 10 and the other from the slave reference oscillator 12. In the absence of a fault, these two clock signals from the master and slave reference oscillators should both be present and in synchronism with one another. If the slave reference oscillator 12 should fail, then each slave oscillator 14a to 14c will receive only the clock signal from the master reference oscillator 10 and conversely if the master reference oscillator 10 should fail, then the slave reference oscillator 12 will produce a clock signal of the same nominal frequency.

The clock circuit 14a, which is constructed in the same way as the other two clock circuits 14b and 14c, has a control circuit 16 connected to receive the master and slave reference signals and also to a further local crystal oscillator 18. The local oscillator 18 is used by the control circuit 16 only for the purpose of determining if a fault has developed in the master or slave reference oscillators 10 and 12. The three possible states for each of these reference oscillators 10 and 12 are first, that it is oscillating at the correct frequency, second, that it is not oscillating at all, and third, that it is oscillating at an overtone or harmonic of the correct frequency. These three states can readily be discerned from each other by comparing the frequency of the signal from the local oscillator 18 with the received signals from the reference oscillators 10 and 12, this function being performed by the control circuit 16. If both reference oscillators 10 and 12 are functioning correctly then the master reference oscillator 10 is used by the control circuit 16 for clock synchronisation. If one of the reference oscillators 10 and 12 is deemed to be defective, then the control circuit 16 will issue a warning to that effect and use the signal from the functioning reference oscillator 10 or 12 for clock synchronisation. Should the output frequency of both reference oscillators fail to match that of the local oscillator 18, either because the two reference oscillators 10 and 12 have failed or the local oscillator 18 has itself failed, then the clock circuit 14a enters into a failure mode.

A fault in one or both of the reference oscillators 10 and 12 will be separately indicated by each of the clock circuits. On the other hand, failure in any part of only one of the clock circuits 14a to 14c will affect only that clock circuit. This allows warnings from the clock circuits 14a to 14c of faults in the reference oscillators 10 and 12 to be disregarded unless then are in mutual agreement.

The output of the control circuit 16 is applied to a clock driver circuit 20 which generates the various clock signals ClkA1–ClkAn required by the data processing sub-system associated with the slave clock circuit 14a.

The driver circuit 20 may comprise a frequency divider to produce a lower clock frequency at one of the output terminals, if such is required. If a higher frequency than the master reference frequency is required, then the clock driver circuit 22 may comprise an oscillator, a frequency divider and a phase locked loop, the oscillator being locked onto a multiple of the frequency of the signal received from the control circuit 16 by comparing the phase of its frequency divided output with the signal from the control circuit 16 in the phase locked loop. In this way, each clock driver circuit independently generates the various clock signals ClkA1 to CLkCn that are required by its associated data processing sub-system.

It may be seen from the above description of the preferred embodiment that the invention provides three mutually independent sources of clock signals that are nevertheless always in phase with one another because they are all separately synchronised with an external reference. Furthermore, the data processing system is tolerant to a fault occurring anywhere in the clock source, including the external reference, because the external reference is itself duplicated and there is automatic switching to the slave or stand-by reference in the event of a detected failure.

We claim:

1. A clock signal source for providing three mutually independent clock signals, one for each of three processing sub-systems of a triplicated data processing system, the source comprising a master reference oscillator, a slave reference oscillator phase locked to the master oscillator but capable of operating as an independent oscillator in the event of failure of the main reference oscillator, and three mutually independent clock circuits, one for each of three processing sub-systems, each clock circuit connected to the master and slave reference oscillators, each clock circuit being capable of detecting malfunction of the reference oscillators and being phase locked to the output signal of the master reference oscillator when both master and slave reference oscillators are functional, and being phase locked to either one of the reference oscillators when a malfunction is detected in the other.

2. A clock signal source as claimed in claim 1, wherein each clock circuit comprises a local oscillator and means for comparing the signal from the local oscillator to the signals from the two reference oscillators in order to determine a malfunction in the reference oscillators.

* * * * *